United States Patent
Oonk

(10) Patent No.: US 8,303,686 B2
(45) Date of Patent: Nov. 6, 2012

(54) PANEL AND USE OF SUCH A PANEL IN A DEVICE FOR CLEANING GASES BY REMOVING IMPURITIES THEREFROM

(75) Inventor: Herman Johan Oonk, Enschede (NL)

(73) Assignee: Omega Thermo Products LLC, Stratford, WI (US)

(*) Notice: Subject to any disclaimer, the term of this patent is extended or adjusted under 35 U.S.C. 154(b) by 268 days.

(21) Appl. No.: 12/613,146

(22) Filed: Nov. 5, 2009

(65) Prior Publication Data

US 2011/0100212 A1    May 5, 2011

(51) Int. Cl.
*B01D 47/12* (2006.01)

(52) U.S. Cl. ............... 95/210; 96/52; 96/299; 261/108; 261/112.1

(58) Field of Classification Search .......... 95/75; 96/52; 261/103
See application file for complete search history.

(56) References Cited

U.S. PATENT DOCUMENTS

| | | | |
|---|---|---|---|
| 1,940,199 A * | 12/1933 | Wagner | 96/27 |
| 3,726,064 A * | 4/1973 | Rowley | 96/324 |
| 3,738,410 A * | 6/1973 | Ricca et al. | 159/13.3 |
| 5,137,546 A * | 8/1992 | Steinbacher et al. | 95/71 |

FOREIGN PATENT DOCUMENTS

| | | | |
|---|---|---|---|
| DE | 1039037 | | 9/1958 |
| DE | 102004033815 B3 | * | 1/2006 |
| EP | 0415486 A1 | | 3/1991 |
| FR | 2613254 A1 | * | 10/1988 |
| FR | 2613254 A1 | | 10/1988 |
| FR | 2613254 A1 | * | 10/2007 |
| GB | 277281 | | 12/1927 |
| GB | 1530203 | | 10/1978 |
| GB | 2154466 A | | 9/1985 |
| JP | 61134226 A | | 6/1986 |
| NL | 1712309 A1 | * | 4/2006 |
| NL | EP-1712309 A1 | * | 10/2006 |
| WO | 0208659 A1 | | 1/2002 |

* cited by examiner

Primary Examiner — Duane Smith
Assistant Examiner — Ives Wu
(74) *Attorney, Agent, or Firm* — The Webb Law Firm

(57) ABSTRACT

The invention relates to a panel, comprising: two plates of substantially equal dimensions positioned on each other; which plates are connected medium-tightly to each other along their peripheral zones; which plates enclose a cavity; a feed for feeding a liquid, in particular water, into the cavity; and openings close to and along a peripheral edge of the panel for flow of the liquid out of the cavity during operation such that during operation the openings are situated close to the upper peripheral edge of the panel, wherein the liquid flows downward over at least one outer surface of the panel.

6 Claims, 3 Drawing Sheets

PANEL AND USE OF SUCH A PANEL IN A DEVICE FOR CLEANING GASES BY REMOVING IMPURITIES THEREFROM

BACKGROUND OF THE INVENTION

The invention relates to a panel, particularly for use in a device for cleaning gases by removing impurities therefrom, a method for manufacturing such a panel, a method for cleaning such a panel and a device and method for cleaning gases. Cleaning of gases is particularly understood to mean at least the removal of impurities from gases.

The impurities may comprise solid constituents, fluid constituents and/or gaseous constituents.

A known panel is used for instance in a device for cleaning flue gases, wherein the device comprises a plurality of panels disposed vertically at a distance from each other, wherein water flows downward over both sides of the panels for the purpose of removing impurities from the gases which have accumulated on the sides. For the purpose of causing the water to flow over the sides the known device is provided with a horizontal header which is filled with water and which is provided on its underside with a number of fine holes, these holes generating a flow of water to a smooth tube which in turn delivers the downward flowing water to both sides of a panel. Drawbacks of the known device are that the positioning of the header and the smooth tube above the panel requires precision, and that the device is expensive, susceptible to breakdown, difficult to maintain and replacement of parts is awkward.

SUMMARY OF THE INVENTION

It is an object of the invention to obviate the above stated drawbacks. For this purpose the panel according to the invention comprises:

two plates of substantially equal dimensions positioned on each other;

which plates are connected medium-tightly to each other along their peripheral zones;

which plates enclose a cavity;

a feed for feeding a liquid, in particular water, into the cavity; and openings close to and along a peripheral edge of the panel for flow of the liquid out of the cavity during operation such that during operation the openings are situated close to the upper peripheral edge of the panel, wherein the liquid flows downward over at least one outer surface of the panel.

The plates may consist of any suitable material, e.g. a metal, such as aluminum, steel, particularly stainless steel or carbon-steel, or a synthetic resin, if necessary fiber-reinforced, e.g. a glass-fiber reinforced epoxy resin.

An advantage of the panel according to the invention is that the cavity in the panel can be used to press water supplied via the feed, which is preferably situated close to the lower peripheral edge of the panel, upward from the underside such that the water flows through the openings close to the upper peripheral edge and downward over the relevant outer surface of the panel. When the panel is used in a device for cleaning gases, the header and the smooth tube are hereby unnecessary, whereby possible problems with the positioning of the header and the smooth tube above a panel do not occur. Furthermore, material is hereby saved and installation and maintenance of the device are simplified.

The openings are preferably arranged in at least one of the two plates. This provides a practical advantage, since the openings can be arranged in the plates in simple manner by means of drilling or laser cutting. The openings are preferably situated at a constant mutual distance, wherein the distance between an opening and the nearby peripheral edge of the panel is the same for each opening. The openings are preferably sufficiently large to allow a substantially laminar flow of the liquid out of the openings during operation. An advantage hereof is that the water may flow uniformly over the outer surfaces of the panel.

In a practical embodiment the panel according to the invention has the feature that the feed is situated close to a second peripheral edge of the panel, which second peripheral edge extends opposite the peripheral edge close to which the openings are arranged.

The panel according to the invention is manufactured in simple manner with a method according to the invention, comprising the following steps, to be performed in suitable sequence, of:

(a) positioning two plates of substantially equal dimensions relative to each other;

(b) connecting the two plates medium-tightly to each other along their peripheral zones;

(c) arranging a feed in the panel;

(d) feeding an inflating medium under pressure via the feed such that the two plates, undergoing plastic deformation, move apart in the area between the peripheral seams, thereby creating a panel with a cavity; and (e) arranging openings close to and along one peripheral edge of the panel for flow of a liquid out of the cavity during operation.

The openings can be arranged in simple manner by means of drilling, laser cutting, or any other suitable method. This may take place according to the invention after step (d), since otherwise the buildup of the pressure in the panel for the purpose of moving apart the plates with plastic deformation is not practically possible, unless the previously arranged openings are, for the purpose of pressurizing the panel, temporarily closed, e.g. by means of adhesive tape that is removed after removing the internal pressure. According to this method the flat plates may be provided with the through-holes prior to welding them together and inflating them in order to arrive at a hollow panel according to the invention.

The method preferably comprises the step of (f) locally connecting the two plates to each other prior to step (d) by means of a pattern of welded zones distributed regularly over the surface, wherein in step (d) the two plates, undergoing plastic deformation, move apart in areas between the welded zones.

Through the arrangement of such welded zones the panel at least substantially retains its peripheral form and a more or less flat form during the plastic deformation.

The method preferably comprises the step of (g) exposing the two plates to a corona treatment, wherein grease present on the plates degrades such that the liquid flowing through the openings during operation forms a thin film on at least one outer surface of the panel.

The panel according to the invention is easily cleaned with a method according to the invention, comprising the step of (h) placing the cavity into medium-throughflow connection with the environment via the feed for the purpose of discharging the liquid present in the cavity from the cavity via the feed such that an underpressure is created in the cavity.

This method for cleaning the panel can be applied particularly when the openings in the panel are blocked. Owing to the created underpressure air will be suctioned through the openings into the cavity, whereby the blockage is removed in simple manner from the openings.

The panel according to the invention is used particularly in a device for cleaning gases, which device comprises:

at least two panels according to the invention disposed vertically at a mutual distance;

these panels being disposed such that the openings are situated close to the upper peripheral edge of the panel;

at least one corona electrode arranged between adjacent panels for the purpose of ionizing impurities present in the gases;

a voltage source connected between the or each corona electrode and each panel such that a voltage is applied between the or each corona electrode and each panel, whereby impurities present in the gases are ionized;

which ionized impurities collect during operation on the surfaces of the panels directed toward the gases;

which collected impurities are removed from the panels during operation by means of the liquid which flows downward out of the openings over the surfaces of the panel directed toward the gases; and a discharge for discharging the liquid with the collected impurities.

As described above, the header and the smooth tube as applied in the known device are unnecessary, whereby possible problems with positioning of the header and the smooth tube above a panel do not occur. According to the invention a reliable and/or inexpensive device is hereby provided for cleaning gases, this device being simple to maintain and install.

The device according to the invention preferably comprises receiving means for receiving the liquid with the collected impurities, these receiving means being connected to the discharge.

The device preferably further comprises a housing in which at least the panels and the corona electrode are accommodated.

The invention further relates to a method for cleaning gases, the method comprising the following steps, to be performed in suitable sequence, of:

(i) guiding the gases for cleaning between at least two panels according to any of the claims 1-5 disposed vertically at a mutual distance, wherein the panels are disposed such that the openings are situated close to the upper peripheral edge of the panel;

(j) exposing the gases for cleaning to corona discharge for the purpose of ionizing impurities present in the gases;

(k) collecting the impurities on the surfaces of the panels directed toward the gases;

(l) feeding a liquid via the feed into the cavity for the purpose of causing the liquid to flow out of the cavity through the openings;

(m) removing the collected impurities from the panels by means of the liquid which flows downward out of the openings over the surfaces of the panel directed toward the gases; and (n) discharging the liquid with the collected impurities.

The liquid is preferably fed into the cavity under low pressure via the feed in step (l), wherein the feed is situated close to the lower peripheral edge of the panel, and wherein the method comprises the step of (o) pressing the liquid upward in the direction of the openings for the purpose of causing the liquid to flow out of the cavity through the openings.

BRIEF DESCRIPTION OF THE DRAWINGS

The invention will be further elucidated with reference to figures shown in a drawing, wherein.

DETAILED DESCRIPTION OF THE PREFERRED EMBODIMENTS

Figure 2:
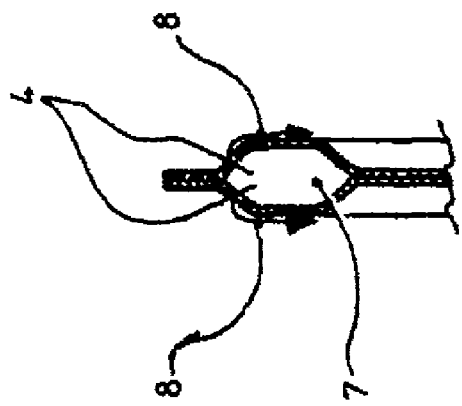
FIG. 2 shows a cross-section through the top part of the panel of FIG. 1.
Figure 1:
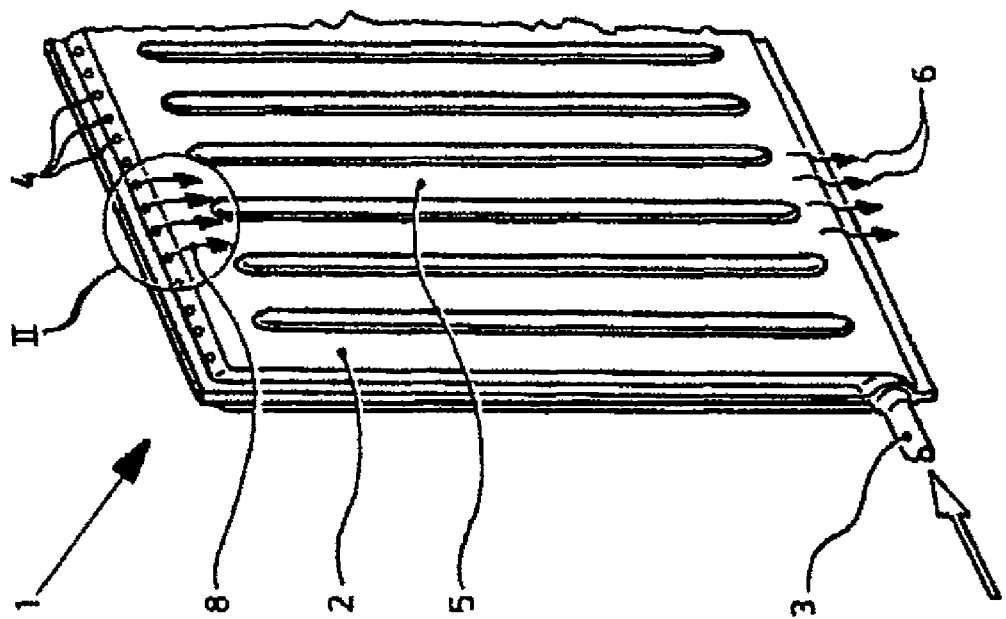
FIG. 1 shows a perspective view of a panel according to the invention.

FIGS. 1 and 2 show a panel 1, in this specific embodiment comprising two stainless steel plates 2 of substantially equal dimensions and a feed 3. Plates 2 are connected to each other along their peripheral zones and enclose a cavity 7 which is in medium-throughflow connection with feed 3. Close to one peripheral edge of panel 1 the plates 2 are provided with openings 4, these openings 4 being in medium-throughflow connection with cavity 7. FIG. 1 shows that openings 4 are arranged in a straight row parallel to the relevant peripheral edge, wherein the mutual distance between each two successive openings 4 is constant.

During operation (see also FIG. 3) panels 1 are disposed vertically, wherein openings 4 are situated close to and along the upper peripheral edge of the panel. Feed 3 is situated during operation on the underside of panel 1 and is used to supply water into cavity 7 at low pressure (order of magnitude of for instance several tenths bar), after which the water in cavity 7 is pressed upward in the direction of openings 4. The water then flows out of cavity 7 through openings 4 and downward in the direction 8 over outer surfaces 5 of panel 1 to the underside of panel 1, where the water runs off panel 1 in direction 6. Openings 4 are preferably sufficiently large to allow at least substantially laminar flow of the water out of openings 4.

Panel 1 can be any hollow panel through which liquid can flow, the panel being provided according to the invention with openings 4 close to and along one peripheral edge. Panel 1 particularly comprises a so-called pillow plate shown in FIGS. 4 and 5 which is per se known and is manufactured according to the invention as follows.

Two plates 2 of substantially equal dimensions are first positioned on each other, wherein a feed 3 is arranged between the two plates 2 such that feed 3 extends at least partially outside the two plates 2. The two plates 2 are then connected medium-tightly to each other along the whole peripheral zone 22, for instance by means of laser welding or seam welding.

Plates 2 are connected locally to each other by means of a pattern, in this case a so-called diamond pattern, of welded zones, in this case substantially circular zones 23 distributed regularly over the surface, in particular by laser welding. The welded zones can be arranged with any desired form, such as, though not exclusively, oval, circular or polygonal. In this arbitrary embodiment the round laser welding zones al have diameters of about 20-50 mm.

Via feed 3 water under pressure (order of magnitude for instance several hundreds psi's) is then supplied such that the two plates 2 move apart while undergoing plastic deformation in the area between the peripheral seams and the welded zones, and cavity 7 is formed. In this embodiment feed 3 is thus used to manufacture panel 1 as well as during use of panel 1.

It is noted that the above described steps can be performed in any suitable sequence. The step described below is however preferably performed after the supply of the water under pressure. This step comprises of arranging openings 4 close to and along the relevant peripheral edge of panel 1.

If openings 4 are arranged prior to the supplying of the water under pressure, the buildup of the pressure in panel 1 for the purpose of moving apart plates 2 with plastic deformation would not be practically possible, unless the openings 4 are temporarily closed prior to pressurizing the panel, e.g. by applying an adhesive tape over the openings 4.

Openings 4 according to the invention can be arranged in any desired manner. Openings 4 are arranged in practical manner by drilling holes in the two plates 2, or by laser cutting.

It is noted that, preferably before they are connected to each other, plates 2 undergo a corona treatment. Grease present on plates 2 hereby degrades, whereby the liquid flowing through openings 4 during operation forms a thin film on outer surfaces 5 of the panel. As an alternative, or in combination therewith, a coating with a micro-molecular or nano-material may be applied, with the same effect.

Figure 3:
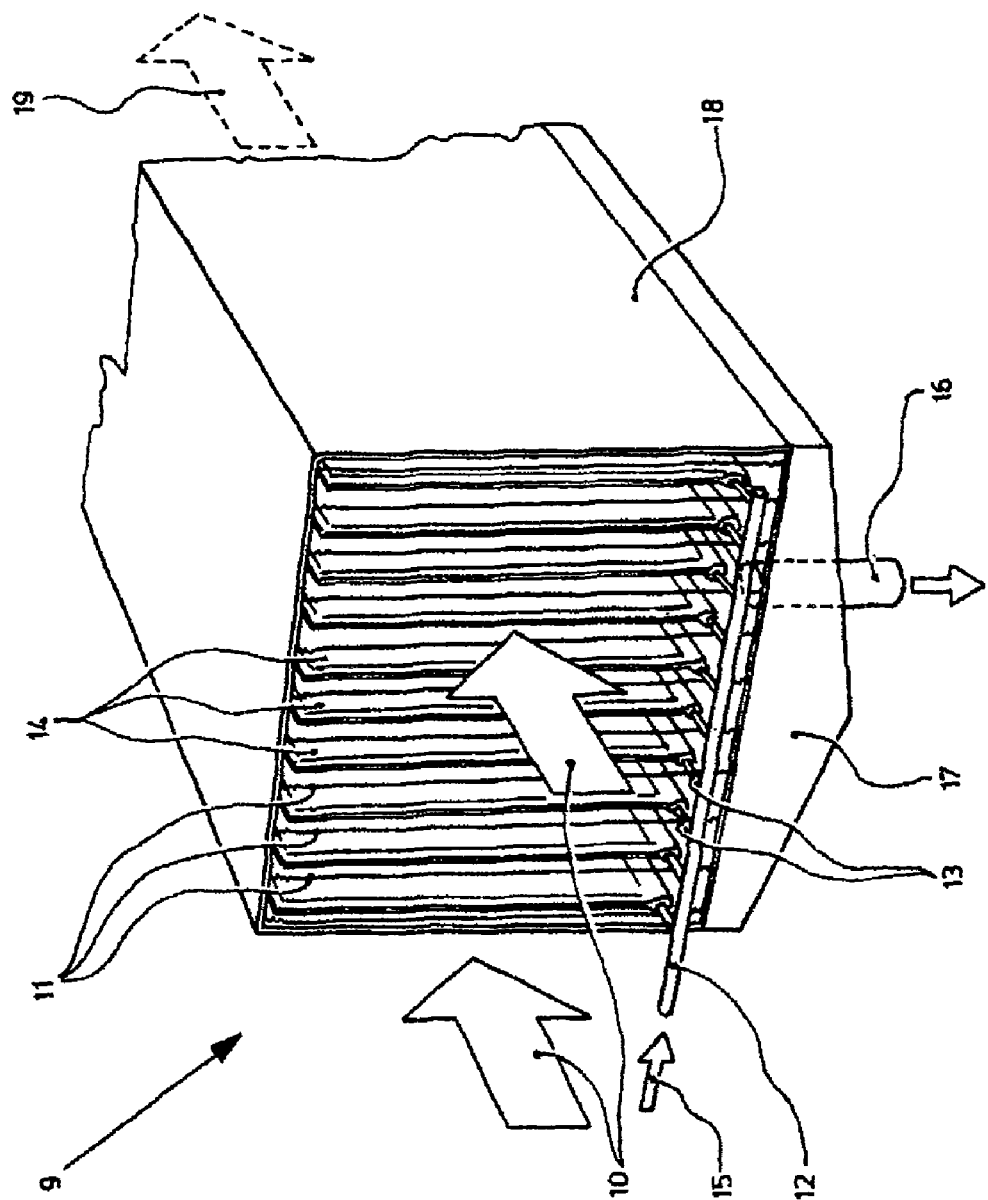
FIG. 3 shows a perspective view of a device for cleaning gases according to the invention.

FIG. 3 shows a device 9 for cleaning gases, such as for instance flue gases, in which use is made of panels 1 as according to FIGS. 1 and 2. Device 9 comprises a housing 18 in which panels 1 are accommodated vertically and at a mutual distance. Device 9 comprises a water feed 15 which supplies water to water feed conduit 12 connected via connections 13 to each water feed 3 of panels 1, which water feed conduit 12 supplies water at low pressure to feeds 3 during operation. As described above, this water is pressed upward into each cavity 7, from where the water flows downward through openings 4 over outer surfaces 5 (see FIGS. 1, 2), these outer surfaces 5 being in this application the surfaces of panels 1 directed toward the gases that are flowing by. Device 9 also comprises a receptacle 17 for receiving the water running off panels 1 and a discharge 16 connected to receptacle 17 for discharging the water.

Device 9 also comprises corona wires 11 which are under high voltage during operation (in the order of magnitude of 50 kV) relative to panels 1, this voltage being applied by a voltage source (not shown) connected between panels 1 and corona wires 11.

Device 9 is applied in the following manner in order to clean gases. The gases for cleaning are guided in direction 10 between panels 1 disposed vertically at a mutual distance. As the gases pass between panels 1 the gases are exposed to corona discharge by means of corona wires 11, whereby impurities present in the gas ionize and are therefore attracted by the panels. The impurities are hereby collected on the surfaces 5 of panels 1 directed toward the gases, where the impurities are entrained to the underside of panel 1 with the liquid flowing downward out of openings 4 over the surfaces 5 of panel 1 directed toward the gases. The liquid with the impurities is then received in receptacle 17 and discharged via discharge 16. The cleaned gases, thus with impurities removed, leave device 9 in direction 19. Such a method is preferably performed continuously.

Openings 4 are preferably sufficiently large that they will not become blocked by possible impurities present in the water in cavity 7. If blockage of an opening 4 has however occurred, a panel 1 can be cleaned in simple manner by placing cavity 7 into medium-throughflow connection with the environment via feed 3 for the purpose of discharging the liquid present in cavity 7 from cavity 7 via feed 3 such that an underpressure is created in cavity 7. Owing to the thus created underpressure air will be suctioned into cavity 7 through openings 4, whereby the impurities are easily removed from openings 4. It is noted that the panel can be provided for this purpose with a discharge.

Figure 5:
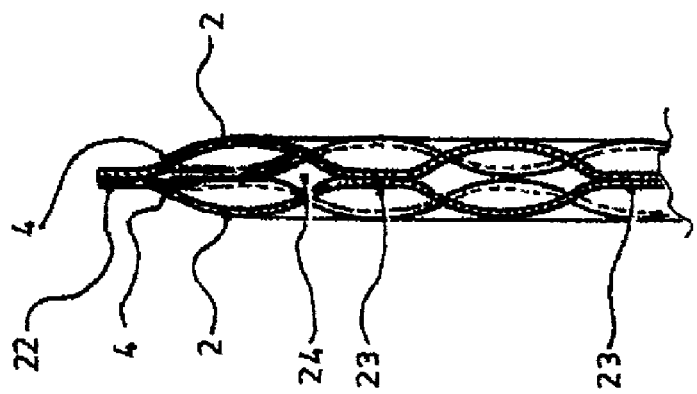
FIG. 5 shows a vertical cross-section according to the plane V-V of FIG. 4.
Figure 4:
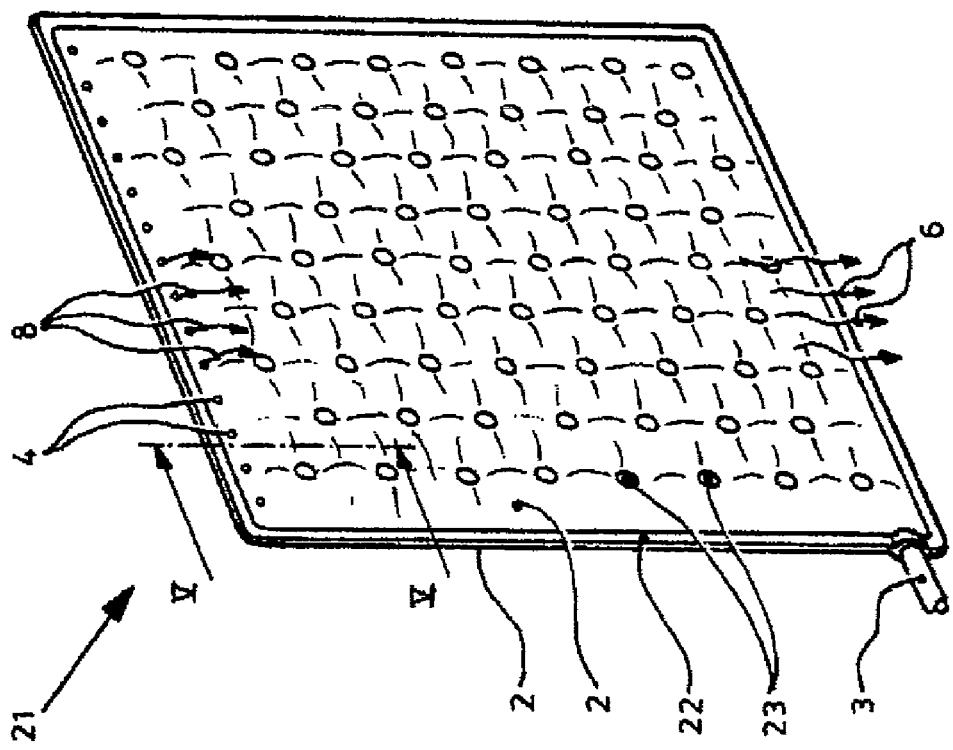
FIG. 4 shows a perspective view of a panel according to the invention in a second embodiment.

FIGS. 4 and 5 show an embodiment, in which a series of perforations or through-holes 4 are arranged close to and extending along the upper sealed edge 22 of panel 21, in accordance with the arrangement shown in FIG. 1.

The diamond pattern of welding zones 23, over which the two plates are fixed to each other, defines the cavity 24 between them, as shown in FIG. 5. The regular, though non-flat shape of the outer surfaces of panel 21 has the important effect, that the water 8 flowing out of the openings 4 in downward direction over the outer surfaces of the panels, does not have a tendency to gradually concentrate in the middle zone of panel 21, which unwanted phenomenon may occur in case of smooth and flat surfaces, but ensures that the flow is evenly distributed over substantially the whole respective outer surface. For this reason, the use of a pillow plate in accord with the FIGS. 4 and 5 embodiment is preferred.

The holes 4 may have any suitable dimension and shape. It is to be expected that a simple round shape is perfectly effective. Such a shape can be readily be arranged by drilling or laser cutting. The holes may have any practical diameter, e.g. in the order of magnitude of 2-6 mm.

The invention is not limited to the shown embodiment, but also extends to other variants falling within the scope of the appended claims.

The invention claimed is:

1. A panel, comprising:
   two plates of substantially equal dimensions positioned on each other;
   which plates are connected medium-tightly to each other along their peripheral zones;
   which plates enclose a cavity;
   a feed for feeding a liquid, in particular water, into the cavity; and
   openings close to and along one peripheral edge of the panel for flow of the liquid out of the cavity during operation such that during operation the openings are situated close to the upper peripheral edge of the panel, wherein the liquid flows downward over at least one outer surface of the panel.

2. The panel as claimed in claim 1, wherein the openings are arranged in at least one of the two plates.

3. The panel as claimed in claim 1, wherein the openings are situated at a constant mutual distance from each other, and wherein the distance between an opening and the nearby peripheral edge of the panel is the same for each opening.

4. The panel as claimed in claim 1, wherein the openings are sufficiently large to allow at least substantially laminar flow of the liquid out of the openings during operation.

5. The panel as claimed in claim 1, wherein the feed is situated close to a second peripheral edge of the panel, which second peripheral edge extends opposite the peripheral edge close to which the openings are arranged.

6. A method for cleaning a panel as claimed in claim 1, comprising placing the cavity into medium-throughflow connection with the environment via the feed for the purpose of discharging the liquid present in the cavity from the cavity via the feed such that an underpressure is created in the cavity.

* * * * *